US005783620A

United States Patent [19]

Hamashima et al.

[11] Patent Number: 5,783,620
[45] Date of Patent: Jul. 21, 1998

[54] THERMOPLASTIC RESIN COMPOSITION FOR PROFILE EXTRUSION

[75] Inventors: Nobuyuki Hamashima; Michio Nakata; Gorou Shimaoka, all of Hiratsuka, Japan

[73] Assignee: Mitsubishi Engineering-Plastics Corporation, Japan

[21] Appl. No.: 802,407

[22] Filed: Feb. 18, 1997

Related U.S. Application Data

[63] Continuation of Ser. No. 644,859, May 10, 1996, abandoned.

[30] Foreign Application Priority Data

| May 17, 1995 | [JP] | Japan | 7-118406 |
| May 17, 1995 | [JP] | Japan | 7-118407 |
| May 17, 1995 | [JP] | Japan | 7-118408 |

[51] Int. Cl.$^6$ .................. C08L 69/00; B29C 47/00
[52] U.S. Cl. ................ 524/405; 524/413; 524/423; 524/432; 524/442; 524/445; 524/449; 524/451; 524/456; 524/504; 525/67; 525/146; 264/169; 264/170; 264/209.1; 264/211
[58] Field of Search ............. 264/209.1, 221, 264/169, 170; 525/67, 46, 148; 524/405, 413, 423, 432, 442, 445, 449, 451, 456, 504

[56] References Cited

U.S. PATENT DOCUMENTS

| 4,430,476 | 2/1984 | Liu | 525/146 |
| 4,435,544 | 3/1984 | Schreckenberg | 525/146 |
| 4,562,222 | 12/1985 | Liu | 524/505 |
| 4,563,502 | 1/1986 | Liu | 525/146 |
| 4,564,658 | 1/1986 | Liu | 525/67 |
| 4,783,494 | 11/1988 | Allen | 525/148 |
| 4,792,585 | 12/1988 | Yamamoto | 525/67 |
| 5,286,790 | 2/1994 | Laughner | 525/146 |
| 5,569,700 | 10/1996 | Iwakiri | 525/67 |

FOREIGN PATENT DOCUMENTS

| 0 077 415 | 4/1983 | European Pat. Off. . |
| 0 111 179 A1 | 6/1984 | European Pat. Off. . |
| 0 122 601 | 10/1984 | European Pat. Off. . |
| 433797 | 6/1991 | European Pat. Off. ......... 525/146 |
| 0 494 602 | 7/1992 | European Pat. Off. . |
| 0 496 258 A3 | 7/1992 | European Pat. Off. . |
| 0 589 349 | 3/1994 | European Pat. Off. . |
| 0 106 097 | 4/1994 | European Pat. Off. . |
| 0 676 449 A3 | 10/1995 | European Pat. Off. . |
| 676449 | 10/1995 | European Pat. Off. . |
| 1 569 448 | 6/1970 | Germany . |
| 157648 | 12/1980 | Japan ............ 525/67 |
| 017153 | 2/1983 | Japan ............ 525/67 |
| 066448 | 4/1984 | Japan ............ 525/67 |
| 156850 | 6/1988 | Japan ............ 525/67 |

OTHER PUBLICATIONS

Patent Abstracts of Japan, vol. 16, No. 512, Oct. 22, 1992 & JP-A-04n 189864 (Tsutsunaka Plast. Ind. Co. Ltd). Jul. 8, 1992.

Research Disclosure. No. 339, Jul. 1, 1992, pp. 555–562, Ilenda, C. S.: "Modification of Polycarbonate by a Crystalline Polyolefin and a Graft Copolymer", pp. 558–559.

Patent Abstracts of Japan, vol. 7, No. 53, Mar. 3, 1983 & JP-A-57 200444 (Idemitsu Sekiyu Kagaku KK), Dec. 8, 1982.

Plastic Additives. An Industrial Guide, E. W. Flick, 1986, Noyes Publications, Park Ridge, New Jersey, p. 632.

*Primary Examiner*—David Buttner
*Attorney, Agent, or Firm*—Parkhurst & Wendel, L.L.P.

[57] ABSTRACT

A thermoplastic resin composition for profile extrusion, comprises: (A1) 50 to 99.5% by weight of a thermoplastic aromatic polycarbonate resin; (A2) 0 to 40% by weight of a thermoplastic resin other than the thermoplastic aromatic polycarbonate resin and an ethylene-based resin or a modified olefin-based resin; (B) 0.5 to 30% by weight of the ethylene-based resin or the modified olefin-based resin; and (C) 0 to 30% by weight of a filler.

9 Claims, 1 Drawing Sheet

THERMOPLASTIC RESIN COMPOSITION FOR PROFILE EXTRUSION

This is a Continuation of application Ser. No. 08/644,859 filed May 10, 1996, now abandoned.

BACKGROUND OF THE INVENTION

The present invention relates to a thermoplastic resin composition for profile extrusion. More particularly, the present invention relates to a thermoplastic resin composition for profile extrusion, which comprises a thermoplastic aromatic polycarbonate resin and an ethylene-based resin or a modified olefin-based resin, and which is light-weight and has an excellent heat-resistance, an excellent impact resistance, an excellent appearance, an excellent draw-down and excellent swell properties, and further relates to a thermoplastic resin composition for profile extrusion in which the generation of mold deposit out of die, especially at a tip end of the extrusion die, is effectively prevented when the thermoplastic resin composition according to the present invention is subjected to a profile extrusion, and even if the mold deposit out of die is formed, such mold deposit can be readily removed from the die.

It is known that an aromatic polycarbonate resin is excellent in mechanical strength, durability and dimensional stability. Accordingly, the aromatic polycarbonate resin has been utilized in various fields such as electrical and electronic apparatus, office automation equipments, precision machinery equipments, medical treatment equipments, automobile equipments, miscellaneous goods, building materials or the like. The aromatic polycarbonate resin is usually molded by an injection molding process, there have been proposed many aromatic polycarbonate resin composition suitable for injection molding. When the aromatic polycarbonate resin is utilized in the field of building materials, it is required that the aromatic polycarbonate resin is subjected to a profile extrusion, thereby obtaining a complicated molded product. However, in the event that the aromatic polycarbonate resin is utilized in such a profile extrusion, many problems have been caused.

That is, since the aromatic polycarbonate resin exhibits a high temperature dependency on its melt viscosity and a low melt strength, there occur defects that the aromatic polycarbonate resin is unsatisfactory in draw-down property and shaping property at the time of the profile extrusion.

In order to overcome the afore-mentioned defects, a high-viscosity aromatic polycarbonate resin or a branched-polycarbonate resin has been proposed. However, these resins are still insufficient in obtaining a complicated molded product by using the profile extrusion.

Further, the molding temperature of the aromatic polycarbonate resin is not less than 250° C. Consequently, when the aromatic polycarbonate resin is subjected to a continuous profile extrusion at such a high temperature, the formation of undesirable mold deposits out of die is observed at a tip end of the extrusion die. The mold deposit out of die is grown with passage of time and finally adhered to a surface of the molded product, which causes a poor appearance of the molded product and makes it impossible to introduce the molded product into a sizing die. Thus, problems such as defective shaping property and inapplicability to a continuous production process are caused.

In the case where the aromatic polycarbonate resin is applied to building materials required to have a high mechanical strength and a rigidity, an adequate amount of a filler such as an inorganic filler, e.g., glass fiber may be often added to the aromatic polycarbonate resin to achieve a flexural modulus of not less than 50,000 kg/cm$^2$. However, the addition of such an inorganic filler or various additives causes an increase in specific gravity, which makes it difficult to achieve a light weight molded product. Further, the addition of the inorganic filler or various additives induces formation of mold deposit out of die, so that it becomes considerably difficult to accomplish a continuous profile extrusion of the aromatic polycarbonate resin.

In view of the afore-mentioned defects, there have been made various attempts which include optimizing a configuration of a screw mechanism of the extruder, providing a vent in the extruder, improving materials and shape for the die of the extruder or the like. However, these attempts are still unsuccessful to provide a complicated molded product using the profile extrusion process.

As a result of intense studies and investigations made by the present inventors to solve the afore-mentioned technical problems, it has been found that by blending a specific ethylene-based resin or a specific modified olefin-based resin with a thermoplastic aromatic polycarbonate resin at a specific blending ratio, the obtained thermoplastic resin composition is light-weight and is excellent in heat-resistance, impact resistance and extrudability, and when such a thermoplastic resin composition is subjected to a continuous profile extrusion, the formation of mold deposit out of die is rarely observed, and even if any mold deposit out of die is eventually formed, it can be readily removed from the die. On the basis of the finding, the present invention has been attained.

SUMMARY OF THE INVENTION

It is an object of the present invention to provide a thermoplastic resin composition suitable for a profile extrusion, which is light-weight and is excellent in rigidity, impact resistance, heat resistance and profile extrusion property.

It is another object of the present invention to provide a thermoplastic resin composition suitable for a profile extrusion, which contains mainly a thermoplastic aromatic polycarbonate resin and shows an excellent profile extrusion property, so that a complicated molded product can be produced substantially without formation of mold deposit out of die in the profile extrusion, and further even if any mold deposit out of die is eventually formed, it can be readily removed from the die.

To accomplish the aims, in a first aspect of the present invention, there is provided a thermoplastic resin composition for profile extrusion, comprising: (A1) 50 to 99.5% by weight of a thermoplastic aromatic polycarbonate resin; (A2) 0 to 40% by weight of a thermoplastic resin other than the thermoplastic aromatic polycarbonate resin as a component (A1) and an ethylene-based resin or a modified olefin-based resin as a component (B); (B) 0.5 to 30% by weight of the ethylene-based resin or the modified olefin-based resin; and (C) 0 to 30% by weight of a filler.

In a second aspect of the present invention, there is provided a thermoplastic resin composition for profile extrusion, comprising: (A1) 50 to 95% by weight of a thermoplastic aromatic polycarbonate resin, (A2) 0 to 40% by weight of a thermoplastic resin other than the thermoplastic aromatic polycarbonate resin as a component (A1) and polyethylenes as a component (B), (B) 2 to 30% by weight of the polyethylenes, and (C) 5 to 30% by weight of a filler.

In a third aspect of the present invention, there is provided a thermoplastic resin composition for profile extrusion, comprising: (A1) 50 to 99.5% by weight of a thermoplastic aromatic polycarbonate resin, (A2) 0 to 40% by weight of a thermoplastic resin other than the thermoplastic aromatic polycarbonate resin as a component (A1) and polyethylenes prepared in the presence of a chromium catalyst, (B) 0.5 to 30% by weight of the polyethylenes prepared in the presence of a chromium catalyst, and (C) 0 to 30% by weight of a filler.

In a fourth aspect of the present invention, there is provided a thermoplastic resin composition for profile extrusion, comprising: (A1) 50 to 99.5% by weight of a thermoplastic aromatic polycarbonate resin; (A2) 0 to 40% by weight of a thermoplastic resin other than the thermoplastic aromatic polycarbonate resin as a component (A1) and modified olefin polymers as a component (B); (B) 0.5 to 30% by weight of the modified olefin polymers prepared by grafting $\alpha,\beta$-unsaturated carboxylic acid or a derivative thereof to polymers of ethylene, polymers of $\alpha$-olefin having not less than 3 carbon atoms or copolymers of ethylene and $\alpha$-olefin having not less than 3 carbon atoms, said $\alpha,\beta$-unsaturated carboxylic acid or derivatives thereof being grafted in an amount of 0.05 to 1.5% by weight based on the weight of said polymer or copolymer component; and (C) 0 to 30% by weight of filler.

DETAILED DESCRIPTION OF THE INVENTION

Figure 1:
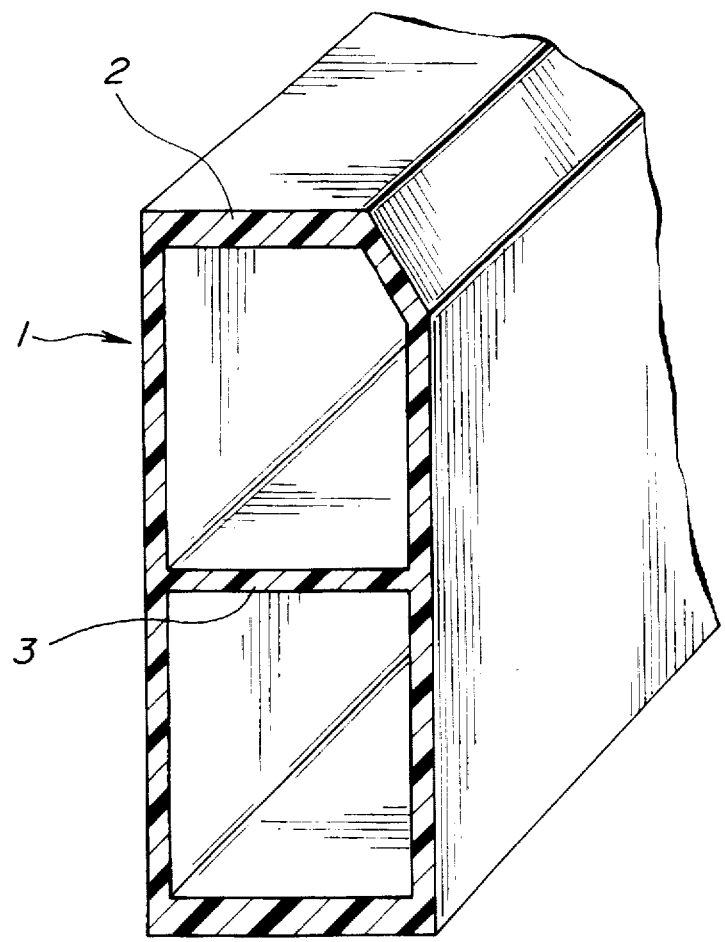
FIG. 1 is a cross-sectional view schematically showing a hollow profile-extruded article prepared from the thermoplastic resin composition according to the present invention.

The thermoplastic aromatic polycarbonate resin as the component (A1) of the thermoplastic resin composition according to the present invention is a polymer produced by reacting an aromatic dihydroxy compound or a mixture of the aromatic dihydroxy compound and a small amount of polyhydroxy compound with phosgene or dicarbonate, which thermoplastic aromatic polycarbonate polymer may be branched. Examples of the aromatic dihydroxy compounds may include 2,2-bis(4-hydroxyphenyl)propane (=bisphenol A), tetramethylbisphenol A, tetrabromobisphenol A, bis(4-hydroxyphenyl)-p-diisopropyl benzene, hydroquinone, resorcinol, 4,4'-dihydroxydiphenyl or the like. The preferred aromatic dihyroxyl compound is bisphenol A.

For production of the branched aromatic polycarbonate resin by the afore-mentioned reaction, a part, for example, 0.1 to 2 mole %, of the aromatic dihydroxy compound may be substituted with a polyhydroxy compound or a bisphenol compound. Examples of the suitable polyhydroxy compound may include chloroglycine, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,4,6-dimethyl-2,4,6-tri(4-hydroxyphenyl)heptane, 1,3,5-tri(4-hydroxyphenyl)benzene, 1,1,1-tri(4-hydroxyphenyl)ethane or the like. Examples of the suitable bisphenol compound may include 3,3-bis(4-hydroxyaryl)-oxyindole (=isatinbisphenol), 5-chloroisatinbisphenol, 5,7-dichloroisatinbisphenol, 5-bromoisatinbisphenol or the like.

The blending percentage of the thermoplastic aromatic polycarbonate resin is in the range of 50 to 99.5% by weight, preferably 60 to 95% by weight, more preferably 70 to 95% by weight based on the weight of thermoplastic resin composition.

Further, a monovalent aromatic hydroxy compound may be used for controlling a molecular weight of the thermoplastic aromatic polycarbonate resin. As the preferred monovalent aromatic hydroxy compound, m-methyl phenol, p-methyl phenol, m-propyl phenol, p-propyl phenol, p-bromophenol, p-tert-butylphenol, p-long chain alkyl-substituted phenol or the like may be exemplified. Typical examples of the thermoplastic aromatic polycarbonate resins may include bis-(4-hydroxyphenyl)alkane-based compounds, especially polycarbonates prepared from bisphenol A as a main raw material, a polycarbonate copolymer prepared by jointly using at least two aromatic dihydroxy compounds, a branched polycarbonate prepared by using a small amount of a trivalent phenol-based compound or the like. The thermoplastic aromatic polycarbonate resins may be used singly or in the form of a mixture of two or more.

The thermoplastic resin other than the thermoplastic aromatic polycarbonate resin as a component (A1) and ethylene-based resin or modified olefin-based resin as a component (B), used as a component (A2) of the thermoplastic resin composition according to the present invention, may include polyamide resins, acrylic resins, modified polyphenylene ether resins, polyacetal resins, polypropylene resins, a polyvinyl chloride resins, styrene resins, aromatic polyester resins, a liquid crystal polyester resins or the like. The blending percentage of the thermoplastic resin (A2) other than the thermoplastic aromatic polycarbonate resin and ethylene-based resin or modified olefin-based resin is in the range of 0 to 40% by weight, preferably 3 to 30% by weight based on the weight of the thermoplastic resin composition.

The thermoplastic aromatic polycarbonate resin is preferably mixed with styrene-based resins in order to lower a melt temperature thereof and, therefore, to decrease a molding temperature thereof. Examples of the suitable styrene-based resins may include general-purpose polystyrene resin (GPPS), high-impact polystyrene resin (HIPS), acrylonitrile-butadiene-styrene resin (ABS), acrylonitrile-(ethylene-propylene-diene terpolymer)-styrene resin (AES), acrylonitrile-acrylic-styrene resin (AAS), methylmethacrylate-butadiene-styrene resin (MBS), styrene-butadiene rubber (SBR), styrene-ethylene-butadiene-styrene resin (SEBS), styrene-ethylene-propylene-styrene resin (SEPS), or the like. These styrene resins can be used singly or in the form of a mixture of two or more. The blending percentage of the styrene-based resins is preferably not more than 50% by weight, more preferably 2 to 20% by weight based on the weight of the thermoplastic aromatic polycarbonate resin.

Furthermore, the thermoplastic aromatic polycarbonate resin may be mixed with aromatic polyester resins in order to improve a chemical resistance thereof. The aromatic polyester resin is, for example, a polyester prepared from an aromatic dicarboxylic acid and diol. Examples of the suitable aromatic dicarboxylic acid used for the preparation of the aromatic polyester resin may include polyethylene terephthalate, polyethylene naphthalate, polybutylene terephthalate, polybutylene naphthalate, polycyclohexane diterephthalate or the like. The aromatic polyester resins can be used singly or in the form of a mixture of two or more. The blending percentage of the aromatic polyester resins is preferably not more than 50% by weight based on the weight of the thermoplastic aromatic polycarbonate resin.

The ethylene-based resin or the modified olefin-based resin used as the component (B) of the thermoplastic resin composition according to the present invention, may include (B1) polyethylenes, (B2) polyethylenes prepared in the presence of a chromium catalyst, and (B3) modified olefin polymers.

The polyethylenes (B1) are effective for improving a moldability of the thermoplastic resin composition when subjected to a profile extrusion. That is, as compared with the case where the thermoplastic aromatic polycarbonate resin is used singly, the addition of the polyethylenes to the thermoplastic aromatic polycarbonate resin improves a temperature dependency of its melt viscosity and enhances a die swell ratio, resulting in preventing occurrence of draw-down and exhibiting an excellent shaping property at the time of the profile extrusion.

The polyethylenes (B1) may be prepared according to either high-pressure method (conventional method), moderate-pressure method or low-pressure method known in the production of polyethylene. For example, the polyethylene may be long chain-branched polyethylenes, short chain-branched polyethylenes or linear polyethylenes. In addition, as the polyethylenes (B1) copolymers of ethylene and α-olefin such as butene-1, hexene-1,4-methyl pentene-1 or octene-1 may be used. The polyethylenes (B1) has a melt index (MI) of 0.01 to 50 and a density of 0.88 to 0.97. The polyethylenes having a melt index of 0.01 to 5 are especially preferred.

The blending percentage of the polyethylenes (B1) is in the range of 2 to 30% by weight based on the weight of the thermoplastic resin composition. If the blending percentage of the polyethylene (B1) is less than 2% by weight, the thermoplastic resin composition is likely to suffer from draw-down when subjected to the profile extrusion, so that an improvement in shaping property at the time of the profile extrusion cannot be sufficiently obtained. If the blending percentage of the polyethylenes (B1) exceeds 30% by weight, the thermoplastic resin composition is inferior in heat resistance and mechanical strength. The blending percentage of the polyethylenes (B1) is preferably in the range of 5 to 20% by weight based on the weight of the thermoplastic resin composition.

The polyethylenes (B2) obtained in the presence of the chromium catalyst may be prepared according to a moderate- or low-pressure polymerization process in which a chromium-based compound is used as a polymerization catalyst. Examples of the chromium compounds may include Cr 203 supported on a carrier such as silica or silica/alumina, or an organic chromium compound such as silyl chromate or chromocene supported on silica. The polymerization process for the preparation of the polyethylenes (B2) may be conducted by using a slurry method, a solution method, a gas phase method or the like. The polyethylenes (B2) used in the present invention has a melt index (MI) of 0.01 to 50 and a density of 0.90 to 0.97. The polyethylenes (B2) preferably have a melt index (MI) of 0.01 to 5.

The blending percentage of the polyethylenes (B2) prepared by using the chromium-based polymerization catalyst is 0.5 to 30% by weight based on the weight of the thermoplastic resin composition. When the blending percentage of the polyethylenes (B2) is less than 0.5 % by weight, the formation of the mold deposit upon profile extrusion cannot be sufficiently prevented. When the blending percentage of the polyethylenes (B2) exceeds 30% by weight, the heat resistance and mechanical strength of the thermoplastic resin composition are undesirably deteriorated. The blending percentage of the polyethylenes (B2) prepared by using the chromium compound is preferably in the range of 5 to 20% by weight based on the weight of the thermoplastic resin composition.

By blending the polyethylenes (B2) prepared by using the chromium-based polymerization catalyst with the thermoplastic aromatic polycarbonate resin, the formation of the mold deposit out of die is effectively prevented and, even if any mold deposit out of die is formed, the removal procedure thereof can be easily carried out, which enables the thermoplastic resin composition to be continuously extruded into a complicated molded product by using the profile extrusion.

The modified olefin-based polymers (B3) may be prepared by grafting α,β-unsaturated carboxylic acid or a derivative thereof to polymers of ethylene, polymers of α-olefin having not less than 3 carbon atoms or copolymers of ethylene and the α-olefin having not less than 3 carbon atoms (hereinafter referred to as "unmodified olefin polymer" as a whole). The amount of the α,β-unsaturated carboxylic acid or the derivative thereof to be grafted is in the range of 0.05 to 1.5% by weight based on the weight of the unmodified olefin polymer.

Examples of the α-olefin having not less than 3 carbon atoms as the starting material for the modified olefin polymers (B3), may include propylene, butene-1, hexene-1, decene-1,4-methyl-butene-1,4-methyl-pentene-1 or the like. The preferred α-olefins are propylene and butene-1.

The copolymers of ethylene and the α-olefin having not less than 3 carbon atoms (hereinafter referred to as "unmodified ethylene copolymer") may be prepared by copolymerizing not less than 50 mole %, preferably 80 to 95 mole % of ethylene with not more than 50 mole %, preferably 20 to 5 mole % of the α-olefin having not less than 3 carbon atoms in the presence of an organic aluminum compound such as oxy-vanadium-trichloride or vanadium tetrachloride which is a Ziegler-Natta catalyst. The preferred unmodified ethylene copolymers are a series of resins commercially available under the trade name "TAFMER" (produced by Mitsui Petrochemical Industries, Co., Ltd.) which includes, for example, TAFMER A-series (ethylene-butene-1 copolymer) such as A4085, A4090 or A20090, TAFMER P-series (ethylene-propylene copolymer) such as P0280, P0480, P0680 or P0880.

The α,β-unsaturated carboxylic acid or the derivative thereof (hereinafter referred to merely as "unsaturated carboxylic acid") which is grafted to the afore-mentioned unmodified olefin polymer, may include acrylic acid, methacrylic acid, ethacrylic acid, maleic acid, fumaric acid, or anhydrides thereof or esters thereof. The particularly preferred unsaturated carboxylic acid is maleic acid anhydride.

The amount of the unsaturated carboxylic acid grafted to the unmodified olefin polymer is in the range of 0.05 to 1.5% by weight based on the weight of the unmodified olefin polymer. When the amount of the unsaturated carboxylic acid grafted is too small, the effect of preventing the formation of the mold deposit out of die upon the profile extrusion and the ease in removing the mold deposit out of die cannot be attained. When the amount of the unsaturated carboxylic acid grafted is too large, undesirable coloration occurs at the time the modified olefin polymers (B3) is added to the thermoplastic aromatic polycarbonate resin (A1). The preferred amount of the unsaturated carboxylic acid grafted is in the range of 0.1 to 1.0% by weight based on the weight of the unmodified olefin polymer.

In the graft polymerization process, the unmodified olefin polymer and the unsaturated carboxylic acid are mixed with each other, and then the mixture is molten and kneaded generally at a temperature of 150° to 300° C. according to an ordinary method, whereby the mixture is subjected to the graft polymerization. In order to conduct the graft polymerization in an effective manner, an organic peroxide such as α,α-bis-t-butyl-peroxy-p-diisopropyl benzene may be added to the mixture in an amount of 0.001 to 0.05% by weight based on the weight of the unmodified olefin polymer.

The modified olefin polymers (B3) has a melt index of 0.01 to 50, preferably 0.01 to 20 (measured at a temperature of 190° C. according to ASTM D-1238). The modified olefin polymer (B3) having such a melt index can be prepared by using the unmodified olefin polymer whose melt index is adjusted to the afore-mentioned range.

The blending percentage of the modified olefin polymers (B3) is preferably in the range of 0.5 to 30% by weight based on the weight of the thermoplastic resin composition. When the blending percentage of the modified olefin polymers (B3) is less than 0.5% by weight, the effect of preventing formation of the mold deposit out of die cannot be sufficiently attained upon the profile extrusion. On the other hand, when the blending percentage of the modified olefin polymers (B3) exceeds 30% by weight, a heat resistance and a mechanical strength of the resultant molded product are deteriorated.

By adding the modified olefin polymers (B3) to the thermoplastic aromatic polycarbonate resin (A1), the formation of the mold deposit out of die is effectively prevented, and further the mold deposit out of die can be easily removed even when the formation there of occurs. This enables t he thermoplastic resin composition to be continuously extruded into the complicated molded product.

Examples of the suitable filler (C) used in the thermoplastic resin composition according to the present invention, may include glass fiber, glass flakes, glass beads, carbon fiber, needle-like titanium oxide, potassium titanate whiskers, aluminum borate whiskers, zinc oxide whiskers, magnesium sulfate, calcium sulfate, wollastonite, clay, talc, mica, silicon carbide and silicon nitride. The afore-mentioned fillers may be used singly or in the form of a mixture of two or more.

The glass fiber usable in the present invention, may include chopped strands having an average fiber diameter of 2 to 30 μm and especially an average fiber length of 3 to 10 mm, milled strands having a length of 30 to 1,000 μm, roving-type strands, or he like. The glass flakes usable in the present invention have an average thickness of 0.1 to 50 μm and an average maximum length of 10 to 2,000 μm. The glass beads usable in the present invention have an average particle size of 5 to 500 μm.

In addition, the carbon fiber usable in the present invention may be commercially available ones having a fiber diameter of 1 to 30 μm, such as polyacrylonitrile (PAN)-based or pitch-based chopped or milled strands or the like. The carbon fiber is suitably treated with a coupling agent, an oxazoline ring-containing organic compounds or other surface-treating agents. Carbon fibers bundled by polycarbonate resin are also suitably used in the present invention.

The potassium titanate whiskers usable in the present invention have an average fiber diameter of 0.1 to 2 μm and an average fiber length of 5 to 50 μm. Suitably, the potassium titanate whiskers are treated with a coupling agent or other surface-treating agents.

The aluminum borate whiskers usable in the present invention have an average fiber diameter of 0.1 to 2 μm and an average fiber length of 5 to 50 μm. Suitably, the aluminum borate whiskers are treated with a coupling agent or other surface-treating agents.

The blending percentage of the filler (component (C)) is not more than 30% by weight based on the weight of the thermoplastic resin composition.

As described hereinafter, depending upon (B1) polyethylenes, (B2) polyethylenes prepared in the presence of chromium catalyst or (B3) modified olefin polymers, is used as the ethylene-based resin or the modified olefin-based resin (component (B)), the preferred blending percentage of the filler are set forth below.

In case of blending the polyethylenes (B1), the preferred blending percentage of the filler added is in the range of 5 to 30% by weight based on the weight of the thermoplastic resin composition. When the blending percentage of the filler in the thermoplastic resin composition is less than 5% by weight, the dimensional stability (low shrinkage ratio), mechanical strength or rigidity of the resultant molded product may be deteriorated, so that the filler may not exhibit the function as a reinforcing material. On the other hand, when the blending percentage of the filler exceeds 30% by weight, the flowability of the thermoplastic resin composition is insufficient, so that the extrusion of the thermoplastic resin composition becomes difficult and remarkable wear is likely to occur at an extrusion cylinder. The blending percentage of the filler is more preferably in the range of 8 to 20% by weight based on the weight of the thermoplastic resin composition.

In case of blending the ethylenes (B2) prepared in the presence of the chromium catalyst or the modified olefin polymer (B3) as the component (B), the preferred blending percentage of the filler is not more than 30% by weight based on the weight of the thermoplastic resin composition. The addition of the filler at such a blending percentage can more improve a dimensional stability (low shrinkage ratio), mechanical strength and rigidity of the resultant molded product. When the blending percentage of the filler exceeds 30% by weight, the flowability of the thermoplastic resin composition is insufficient, so that extrusion of the thermoplastic resin composition becomes difficult and remarkable wear is likely to occur at an extrusion cylinder. The blending percentage of the filler is more preferably in the range of 5 to 20% by weight based on the weight of the thermoplastic resin composition.

In the present invention, various additives such as ultraviolet (UV) absorbers, stabilizers, pigments, dyes and lubricants, and/or reinforcing materials such as organic fibrous materials may be added to the thermoplastic resin composition, if desired. In this case, the blending percentage of the additives and/or reinforcing materials added is not more than 30% by weight based on the weight of the thermoplastic resin composition.

Further, resin materials other than the afore-mentioned resin components (A1), (A2) and (B) may be added the thermoplastic resin composition of the present invention, if necessary. In this case, the blending percentage of the resin materials added is not more than 30% by weight based on the weight of the thermoplastic resin composition.

The extrusion of the thermoplastic resin composition can be conducted by known methods in which the thermoplastic resin composition is kneaded by adequately using extruders, mixers such as Banbury mixer or the like, rolls, or the like.

The molded product produced from the thermoplastic resin composition according to the present invention, suitably has a bending strength of not less than 1,300 kg/cm$^2$ and a flexural modulus of 50,000 kg/cm$^2$.

Especially, when the thermoplastic resin composition according to the present invention containing the polyethylenes (B2) prepared in the presence of the chromium catalyst or the modified olefin polymers (B3), is subjected to a profile extrusion in which 65 mm φ extruder is used, the initial formation of the mold deposit out of die can be prolonged up to at least 30 minutes from commencement of the extrusion process. Further, the time required until the mold deposit out of die is grown to 3 mm length is not less than 60 minutes.

The thermoplastic resin composition for profile extrusion according to the present invention can solve the problems in the prior art and is superior in light-weight, rigidity, wear resistance, heat resistance, profile extrusion property, whereby the thermoplastic resin composition is suitably used for building materials, especially a window frame, a sash door frame or the like, when it is extruded into a molded product by using profile extrusion.

Furthermore, even when the thermoplastic resin composition according to the present invention is continuously subjected to the profile extrusion to obtain profile extrusion products of complicated shape, the formation of the mold deposit out of die is rarely observed. In addition, even when the formation of the mold deposit occurs, it can be readily removed from the die. Further, the thermoplastic resin composition according to the present invention is extremely excellent in profile extrusion property and mass-productivity, which enables the thermoplastic resin composition to be more suitably applied to building materials, especially a window frame, a sash door frame or the like, when it is extruded into a molded product by using profile extrusion.

EXAMPLES

The present invention is described in more detail below by way of examples. However, these examples are only illustrative and not intended to constitute a limitation of the present invention and it is to be understood that other and further modifications and changes can be made without departing from the sprits and the scope of the present invention. Incidentally, "%" appearing in the Examples and Comparative examples is "% by weight".

Examples 1 to 10 and Comparative Examples 1 to 3

An aromatic polycarbonate (PC) resin (a) composed primarily of bisphenol A (Iupilon E-2000 produced by Mitsubushi Gas Chemical Company, Inc., and viscosity-average molecular weight: 28,000); polyethylene (b1) (MITSUBISHI-POLYETHY-HD HB310 produced by Mitsubishi Chemical Corporation), polyethylene (b2) (MITSUBISHI-POLYETHY-HD HB420R produced by Mitsubishi Chemical Corporation) or polyethylene (b3) (MITSUBISHI-POLYETHY-HD HB420R produced by Mitsubishi Chemical Corporation); chopped strand glass fiber (c1) (ECS03T531DE produced by Nippon Electric Glass Co., Ltd., and fiber diameter: 6 μm and length: 3 mm), carbon fiber (c2) (BESFIGHT HTA-C6-CI produced by Toho Rayon Co., Ltd., and fiber diameter: 7 μm and length: 6 mm), potassium titanate whiskers (c3) (TISMO-D produced by Otsuka Chemical Co., Ltd., and fiber diameter: 0.6 μm and length: 20 μm) or aluminum borate whiskers (c4) (ARBOLEX produced by Shikoku Kasei Co., Ltd., and fiber diameter: 1 μm and length: 30 μm); an acrylonitrile-butadiene-styrene resin (d) (DIAPET-ABS SE-3 produced by Mitsubishi Rayon Co., Ltd.); and a polyester resin (e) (polyethylene terephthalate; UNIPET RT-543C produced by Nippon Unipet Co., Ltd.) were mixed together in a tumbler at blending percentages shown in Table 1. The resultant mixture was extruded into pellets by using a single-screw vented extruder. The pellets were dried in a hot-air drying apparatus at a temperature of 120° C. for not less than 5 hours. Thereafter, the pellets were subjected to a profile extrusion at a resin temperature of 260° C. to obtain a molded product 1 as shown in FIG. 1. Test pieces were cut from the molded product 1 and subjected to measurements for physical properties thereof. The results are shown in Table 1.

Incidentally, the bending strength and flexural modulus of the test pieces were measured according to ASTM D-790.

The die-swell of the molded product 1 was measured in the following manner. The molded product extruded from die was allowed to stand in ambient air for cooling. A thickness of an upper wall portion 2 of the molded product 1 was measured. The die-swell was determined as a ratio of the thickness of the molded product to a thickness of the die. Further, the draw-down property of the molded product upon the profile extrusion was evaluated by observing deformation of a center rib portion 3 of the profile article as shown in FIG. 1.

The draw-down property are ranked as follows.

⊚: No deformation due to draw-down occurred;
○: Deformation due to draw-down was within 2 mm;
Δ: Deformation due to draw-down was within 5 mm; and
X: Deformation due to draw-down was not less than 5 mm.

It is desirable that the draw-down property is ranks ⊚ and ○ from the point of view of practical application.

TABLE 1

| Example No. | Composition | | | | | | | | | |
|---|---|---|---|---|---|---|---|---|---|---|
| | (a) | (b1) | (b2) | (b3) | (c1) | (c2) | (c3) | (c4) | (d) | (e) |
| Example 1 | 70 | 10 | — | — | 20 | — | — | — | — | — |
| Example 2 | 70 | — | 10 | — | 20 | — | — | — | — | — |
| Example 3 | 60 | — | 20 | — | 20 | — | — | — | — | — |
| Example 4 | 70 | — | — | 10 | 20 | — | — | — | — | — |
| Example 5 | 60 | — | — | 20 | 20 | — | — | — | — | — |
| Example 6 | 50 | — | 10 | — | 20 | — | — | — | 20 | — |
| Example 7 | 50 | — | 10 | — | 20 | — | — | — | — | 20 |
| Example 8 | 70 | — | 10 | — | — | 20 | — | — | — | — |
| Example 9 | 60 | — | 10 | — | — | — | 30 | — | — | — |
| Example 10 | 60 | — | 10 | — | — | — | — | 30 | — | — |
| Comparative Example 1 | 100 | — | — | — | — | — | — | — | — | — |

TABLE 1-continued

| | | | | | | | | | |
|---|---|---|---|---|---|---|---|---|---|
| Comparative Example 2 | 40 | — | 40 | — | 20 | — | — | — | — | — |
| Comparative Example 3 | 50 | — | 10 | — | 40 | — | — | — | — | — |

| | Bending strength | Flexural modulus ($\times 10^2$) | Profile extrusion property | |
|---|---|---|---|---|
| Example No. | (kg/cm$^2$) | (kg/cm$^2$) | Die-swell | Draw-down |
| Example 1 | 1530 | 58.2 | 1.22 | ◎ |
| Example 2 | 1532 | 58.5 | 1.34 | ◎ |
| Example 3 | 1440 | 55.0 | 1.51 | ◎ |
| Example 4 | 1480 | 56.5 | 1.43 | ◎ |
| Example 5 | 1338 | 51.0 | 1.65 | ◎ |
| Example 6 | 1540 | 59.2 | 1.74 | ○ |
| Example 7 | 1570 | 59.5 | 1.37 | ○ |
| Example 8 | 2074 | 99.8 | 1.38 | ◎ |
| Example 9 | 1810 | 98.1 | 1.27 | ◎ |
| Example 10 | 1756 | 99.5 | 1.27 | ◎ |
| Comparative Example 1 | 873 | 23.7 | 1.13 | X |
| Comparative Example 2 | 1258 | 48.0 | 1.86 | ○ |
| Comparative Example 3 | 1888 | 89.7 | 1.25 | X |

Examples 11 to 17 and Comparative Example 4

An aromatic polycarbonate (PC) resin (a) composed primarily of bisphenol A (Iupilon E-2000 produced by Mitsubushi Gas Chemical Company, Inc. and viscosity-average molecular weight: 28,000); polyethylene (b1) (MITSUBISHI-POLYETHY-hD HB310 (HDPE prepared in the presence of Cr-based catalyst) produced by Mitsubishi Chemical Corporation) or polyethylene (b2) (MITSUBISHI-POLYETHY-HD HB420R (HDPE prepared in the presence of Cr-based catalyst) produced by Mitsubishi Chemical Corporation); chopped strand glass fiber (c) (ECS03T531DE produced by Nippon Electric Glass Co., Ltd., and fiber diameter: 6 μm and length: 3 mm); talc (d) (MISTRON VAPOR produced by Nihon Mistron Co., Ltd.); an acrylonitrile-butadiene-styrene (ABS) resin (e) (DIAPET-ABS SE-3 produced by Mitsubishi Rayon Co., Ltd.); and a polyester resin (f) (polyethylene terephthalate; UNIPET RT-543C produced by Nippon Unipet Co., Ltd.) were mixed together in a tumbler at blending percentages shown in Table 2. The resultant mixture was extruded into pellets by using a single-screw vented extruder. The pellets were dried in a hot-air drying apparatus at a temperature of 120° C. for not less than 5 hours. Thereafter, the pellets were subjected to a profile extrusion at a resin temperature of 260° C. to obtain a molded product 1 as shown in FIG. 1. Test pieces were cut from the molded product 1 and subjected to measurements for physical properties thereof. The results are shown in Table 2.

Examples 18 to 24

An aromatic polycarbonate (PC) resin (a) composed primarily of bisphenol A (Iupilon E-2000 produced by Mitsubushi Gas Chemical Company, Inc. and viscosity-average molecular weight: 28,000); a modified ethylene polymer (b1) (NOVATEC AP-016L produced by Mitsubishi Chemical Corporation) or a modified ethylene copolymer (b2) (NOVATEC AP-750T produced by Mitsubishi Chemical Corporation); chopped strand glass fiber (c) (ECS03T531DE produced by Nippon Electric Glass Co., Ltd., and fiber diameter: 6 μm and length: 3 mm) or talc (d) (MISTRON VAPOR produced by Nihon Mistron Co., Ltd.); and an acrylonitrile-butadiene-styrene (ABS) resin (e) (DIAPET-ABS SE-3 produced by Mitsubishi Rayon Co., Ltd.) or a polyester resin (f) (polyethylene terephthalate; UNIPET RT-543C produced by Nippon Unipet Co., Ltd.) were mixed together in a tumbler at blending percentages shown in Table 3. The resultant mixture was extruded into pellets by using a single-screw vented extruder. The pellets were dried in a hot-air drying apparatus at a temperature of 120° C. for not less than 5 hours. Thereafter, the pellets were subjected to a profile extrusion at a resin temperature of 260° C. to obtain a molded product 1 as shown in FIG. 1. Test pieces were cut from the molded product 1 and subjected to measurements for physical properties thereof. The results are shown in Table 3.

The afore-mentioned resin composition was extruded by using 65 φ mm extruder which was equipped with an extrusion die of a shape corresponding to that of the molded product 1 shown in FIG. 1. The formation of the mold deposit out of die upon the profile extrusion was visually observed to measure a time taken from commencement of the extrusion to initial formation of the mold deposit, and a time required up to reaching 3 mm growth of the gums from commencement of the extrusion. The easiness in removal of the mold deposit grown to 3 mm length was comparatively evaluated by actually removing the mold deposit with a stainless steel spatula.

The draw-down of the molded product upon the profile extrusion was evaluated by observing deformation of the center rib portion 3 of the molded product 1 as shown in FIG. 1.

The easiness in removal of mold deposit are ranked as follows.

○: Mold deposit out of die was readily removed from die with spatula and no trace of mold deposit transferred onto the molded product was observed.

Δ: Mold deposit out of die was removable with spatula but adhesion of mold deposit to the shape article was observed.

X: Mold deposit out of die was difficult to remove and the removal was achievable only by stopping operation of the extruder and rubbing an entire surface of the die.

It is desirable that the easiness is rank ○ from the view point of practical application.

The draw-down property are ranked as follows.
◎: No deformation due to draw-down occurred;
○: Deformation due to draw-down was within 2 mm;
△: Deformation due to draw-down was within 5 mm; and
X: Deformation due to draw-down was not less than 5 mm.

It is desirable that the easiness is ranks ◎ and ○ from the view point of practical application.

TABLE 2

| Example No. | Composition | | | | | | |
|---|---|---|---|---|---|---|---|
| | (a) | (b1) | (b2) | (c) | (d) | (e) | (f) |
| Example 11 | 90 | 10 | — | — | — | — | — |
| Example 12 | 99 | — | 1 | — | — | — | — |
| Example 13 | 90 | — | 10 | — | — | — | — |
| Example 14 | 70 | — | 10 | — | — | 20 | — |
| Example 15 | 70 | — | 10 | — | — | — | 20 |
| Example 16 | 70 | — | 10 | 20 | — | — | — |
| Example 17 | 70 | — | 10 | — | 20 | — | — |
| Comparative Example 4 | 100 | — | — | — | — | — | — |

| Example No. | Initial formation time of mold deposit (min.) | 3 mm growth time of mold deposit (min.) | Easiness in removal of mold deposit | Draw-down |
|---|---|---|---|---|
| Example 11 | 45 | 82 | ○ | ◎ |
| Example 12 | 33 | 61 | ○ | ○ |
| Example 13 | 48 | 90 | ○ | ◎ |
| Example 14 | 41 | 79 | ○ | ◎ |
| Example 15 | 43 | 80 | ○ | ◎ |
| Example 16 | 46 | 75 | ○ | ◎ |
| Example 17 | 38 | 70 | ○ | ◎ |
| Comparative Example 4 | 8 | 14 | X | X |

TABLE 3

| Example No. | Composition | | | | | | |
|---|---|---|---|---|---|---|---|
| | (a) | (b1) | (b2) | (c) | (d) | (e) | (f) |
| Example 18 | 90 | 10 | — | — | — | — | — |
| Example 19 | 99 | — | 1 | — | — | — | — |
| Example 20 | 90 | — | 10 | — | — | — | — |
| Example 21 | 70 | — | 10 | — | — | 20 | — |
| Example 22 | 70 | — | 10 | — | — | — | 20 |
| Example 23 | 70 | — | 10 | 20 | — | — | — |
| Example 24 | 70 | — | 10 | — | 20 | — | — |

| Example No. | Initial formation time of mold deposit (min.) | 3 mm growth time of mold deposit (min.) | Easiness in removal of mold deposit | Draw-down |
|---|---|---|---|---|
| Example 18 | 48 | 80 | ○ | ◎ |
| Example 19 | 35 | 70 | ○ | ○ |
| Example 20 | 55 | 98 | ○ | ◎ |
| Example 21 | 49 | 75 | ○ | ◎ |
| Example 22 | 43 | 82 | ○ | ◎ |
| Example 23 | 50 | 81 | ○ | ◎ |
| Example 24 | 38 | 73 | ○ | ◎ |

What is claimed is:

1. In a method of forming a molded article by profile extrusion of a thermoplastic aromatic polycarbonate resin wherein said thermoplastic aromatic polycarbonate resin is extruded through a die to form said article, the improvement comprising using as said thermoplastic aromatic polycarbonate resin a thermoplastic resin composition comprising (A1) 50 to 95% by weight of a thermoplastic aromatic polycarbonate resin;

(A2) 3 to 40% by weight of an acrylonitrile-(ethylenepropylene-diene terpolymer)-styrene resin (AES);

(B) 0.5 to 30% by weight of a polyethylene; and (C) 0 to 30% by weight of a filler, said polyethylene as the component (B) being prepared in the presence of a chromium catalyst, said polyethylene having a melt index of 0.01 to 50 and a density of 0.88 to 0.97, and said filler being at least one selected from the group consisting of glass fibers, carbon fibers, needle-like titanium oxide, potassium titanate whiskers, aluminum borate whiskers, zinc oxide whiskers, magnesium sulfate, calcium sulfate, wollastonite, clay, talc, mica, silicon carbide and silicon nitride.

2. The method of claim 1, wherein said thermoplastic resin composition comprises:

(A1) 50 to 90% by weight of a thermoplastic aromatic polycarbonate resin.

(A2) 3 to 40% by weight of an acrylonitrile-(ethylenepropylene-diene terpolymer)-styrene resin (AES);

(B) 0.5 to 30% by weight of polyethylene, and (C) 5 to 30% by weight of a filler.

3. The method of claim 1, wherein said thermoplastic resin composition comprises:

(A1) 50 to 90% by weight of a thermoplastic aromatic polycarbonate resin.

(A2) 3 to 40% by weight of an acrylonitrile-(ethylenepropylene-diene terpolymer)-styrene resin (AES);

(B) 2 to 30% by weight of polyethylene, and (C) 5 to 30% by weight of a filler.

4. In a method of forming a molded article by profile extrusion of a thermoplastic aromatic polycarbonate resin wherein said thermoplastic aromatic polycarbonate resin is extruded through a die to form said article, the improvement comprising using as said thermoplastic aromatic polycarbonate resin a thermoplastic resin composition comprising (A1) 50 to 95% by weight of a thermoplastic aromatic polycarbonate resin;

(A2) 3 to 40% by weight of an acrylonitrile-(ethylenepropylene-diene terpolymer)-styrene resin (AES);

(B) 0.5 to 30% by weight of a polyethylene; and (C) 0 to 30% by weight of a filler.

5. The method of claim 4, wherein said polyethylene as the component (B) is prepared in the presence of a chromium catalyst.

6. The method of claim 4, wherein said polyethylene has a melt index of 0.01 to 50 and a density of 0.88 to 0.97.

7. The method of claim 4, wherein said filler is at least one selected from the group consisting of glass fibers, carbon fibers, needle-like titanium oxide, potassium titanate whiskers, aluminum borate whiskers, zinc oxide whiskers, magnesium sulfate, calcium sulfate, wollastonite, clay, talc, mica, silicon carbide and silicon nitride.

8. The method of claim 4, wherein said thermoplastic resin composition comprises:

(A1) 50 to 90% by weight of a thermoplastic aromatic polycarbonate resin, (A2) 3 to 40% by weight of an acrylonitrile-(ethylenepropylene-diene terpolymer)-styrene resin (AES);

(B) 0.5 to 30% by weight of polyethylene, and (C) 5 to 30% by weight of a filler.

9. The method of claim 4, wherein said thermoplastic resin composition comprises:

(A1) 50 to 90% by weight of a thermoplastic aromatic polycarbonate resin, (A2) 3 to 40% by weight of an acrylonitrile-(ethylenepropylene-diene terpolymer)-styrene resin (AES);

(B) 2 to 30% by weight of polyethylene, and (C) 5 to 30% by weight of a filler.

* * * * *